United States Patent [19]

Schulze

[11] 4,046,687

[45] Sept. 6, 1977

[54] PROCESS FOR THE ADSORPTIVE REMOVAL OF ARSENIC, ANTIMONY AND/OR BISMUTH FROM AN AQUEOUS SOLUTION

[75] Inventor: Reinhold Schulze, Seevetal, Germany

[73] Assignee: Norddeutsche Affinerie, Hamburg, Germany

[21] Appl. No.: 672,334

[22] Filed: Mar. 31, 1976

[30] Foreign Application Priority Data

Apr. 11, 1975 Germany .............................. 2515861

[51] Int. Cl.$^2$ .............................................. B01D 15/06
[52] U.S. Cl. ..................................... 210/32; 204/108; 210/36; 210/38 B; 423/87
[58] Field of Search .............. 204/108; 210/24, 30 R, 210/32, 36, 38 B; 75/69, 70; 423/87, 88

[56] References Cited

U.S. PATENT DOCUMENTS

| 3,332,737 | 7/1967 | Kraus | 210/38 B |
| 3,696,012 | 10/1972 | Schulze | 204/108 |

*Primary Examiner*—Thomas G. Wyse
*Assistant Examiner*—Ivars Cintins
*Attorney, Agent, or Firm*—Karl F. Ross

[57] ABSTRACT

A process for the adsorptive removal of one or more impurity elements, selected from the group which consists of: arsenic, antimony and bismuth, from an aqueous solution containing same in which the solution is contacted with a water-insoluble or low-solubility salt of phosphoric acid or a phosphoric acid ester (phosphate ester) on a porous substrate.

5 Claims, No Drawings

1

PROCESS FOR THE ADSORPTIVE REMOVAL OF ARSENIC, ANTIMONY AND/OR BISMUTH FROM AN AQUEOUS SOLUTION

CROSS-REFERENCE TO RELATED APPLICATIONS

This application is related to my copending application Ser. No. 576,256, filed May 12, 1975 (U.S. Pat. No. 3,988,225 issued Oct. 26, 1976) and copending, in turn, with Ser. No. 352,079, filed Apr. 17, 1973 (U.S. Pat. No. 3,887,448) describing an improvement upon U.S. Pat. No. 3,696,012.

FIELD OF THE INVENTION

The invention relates to a process for the selective adsorptive removal of one or more of the elements arsenic, antimony and bismuth from an aqueous solution containing same and, more particularly, from a hydrometallurgical solution such as an electrolysis solution used for the recovery of nonferrous metals, e.g. copper.

BACKGROUND OF THE INVENTION

In hydrometallurgical processes, there are often produced solutions which must be worked up to recover the desired end products such as metals or metal salts. The steps whereby the metal or metal salts are recovered from such aqueous solutions are difficult to achieve in the presence of one or more of the impurity elements arsenic, antimony and bismuth.

For the removal of these impurity elements from such solutions, it is known to evaporate a part of the solution to precipitate the metal salt whereby a portion of the impurities remain in the mother liquor or residual solution, while a portion of the impurities are found in the precipitated metal salt. The impurities may be removed from the mother liquor by an electrolytic separation while the impurities can be removed from the precipitate by recrystallization (see Engelhardt "*Die technische Elektrolyse wassriger Losungen*", Teil A, Seite 100 bis 113, Akademische Verlagsgesellschaft, Leipzig, 1932; Tafel, *Lehrbuch der Metallhuttenkunde,* Bd. 1, Seite 560, Seite 568 ff., S. Hirzel Verlag, Leipzig, 1951).

Another known method involves the precipitation of these impurity elements as their sulfides (see H. Saarinen: Nickel Symposium 1970, Seite 13, Gesellschaft deutscher Metallhuttenund Bergleute, Clausthal). This process is limited to cases in which the desired metal will not precipitate during sulfide precipitation of the impurity elements.

In still another method, the pH value of the solution is sharply altered so that the impurity elements are precipitated as simple compounds (A. Lange, Erzmetall 18 (1965) Heft 12, Seite 613 "Hydro- und elektrochemische Zink- und Cadmiumgewinnung").

With large pH changes it is necessary to use large quantities of reagents, such as acids or bases, which increase the expense of the process and cause an enrichment in the solution with neutral salts. Such enrichment is often not desirable.

Still another conventional process has the function of preventing a supersaturation of an electrolyte with one or more of the impurities arsenic, antimony and bismuth. In these processes the electrolyte is brought into contact with a highsurface chemisorption agent (German published application (Auslegeschrift) 20 04 410 (corresponding to U.S. Pat. No. 3,696,012) and German published application - Auslegeschrift- 22 18 934). The chemisorption agent is usually a low-solubility metal oxide hydrate, especially stannic acid. Especially good results with this process are obtained with systems in which the chemisorption agent is deposited on a substrate as described in German printed application - Offenlegungsschrift 21 25 781 and German published application - Auslegeschrift 22 18 900.

While the latter processes have considerable advantages over the earlier art, they also involve certain disadvantages in that the regeneration of the chemisorption must be carried out with an acid of a concentration which does not cause solubilization of the metal oxide hydrate. With permissible acid concentrations, the recovered concentration of arsenic, antimony and/or bismuth in the regenerating solution is relatively low so that a proportionately large volume of acid must be used and worked up to remove the impurities elements therefrom. A further disadvantage is that the metal oxide hydrate can only be applied to the substrate in a coherent manner with difficulty and is not always easy to apply in a uniform active form.

OBJECT OF THE INVENTION

It is the principal object of the present invention to provide a process for the removal of arsenic, antimony and bismuth from aqueous solutions which avoids the disadvantages of the prior art processes and allows such removal in an especially simple, efficient and low-cost manner.

SUMMARY OF THE INVENTION

This object and others which will become apparent hereinafter are attained, in accordance with the present invention, by a process for the removal of arsenic, antimony and/or bismuth from an aqueous solution, especially a hydrometallurgical solution, wherein the solution is brought into contact with a water-insoluble or low-solubility salt of phosphoric acid and/or a phosphate ester on a porous substrate.

Best results are obtained with phosphoric acid salts and/or phosphate ester salts in which the cation is trivalent cerium or lanthanum or tetravalent titanium, zirconium and/or tin.

The alcohol component of the salt-forming phosphate ester can be substantially any monoalcohol, dialcohol or polyalcohol. The key point is that the salt be of low solubility or insoluble in water. The most effective results are obtained with phosphate esters whose alcohol components are selected from the group which consists of: 2-ethyl-hexanol, 2-butoxy-ethanol, isooctanol, decanol, lauryl alcohol, myristicyl alcohol, cetyl alcohol, stearyl alcohol, oleyl alcohol, isotridecanol, nonylphenoldiglycol ether, nonylphenoltetraglycol ether, nonylphenoloctaglycol ether, stearyl alcohol octaglycol ether and phenol or mixtures thereof.

The substrate upon which the phosphoric salt or the phosphate ester salt is applied and in the pores of which the phosphoric acid salt or the phosphate ester salt is fixed, should have a high porosity to permit a high proportion of the salt to be taken up thereon.

The form of the substrate is immaterial although best results have been obtained with small substrate particles of spheroidal (ball) or cylindrical configuration such that the substrate particles can be introduced into a container in the form of a loose packing with minimum flow resistance.

The particles should have a particle size (maximum particle dimension) of about 3 to 10 mm and a porosity of greater than 40%. In the case of ball-shaped and cylindrical particles, both the diameter and the length should lie between 30 and 10 mm. Best results have been obtained with particles having these characteristics and consisting of aluminum silicate, magnesium silicate, magnesium-aluminum silicate, aluminum oxide or silica and being generally commercially available.

The application of the phosphoric acid salt and/or the phosphate ester salt to the pores of the substrate can be carried out by treating the substrate initially with a solution of phosphoric acid or its salts or acid phosphate esters or their salts to fully impregnate the substrate. Thereafter, the treated substrate is brought into contact with a salt solution of a low-solubility salt-forming cation. The reverse sequence of steps is also possible. Thus a solution of the soluble salt of one of the cations identified above can be used to impregnate the particles which can then be treated with the solution of the acid phosphate ester, the solution of a phosphoric acid salt or phosphoric acid.

In either case it has been found to be advantageous to remove at least a part of the solvent of the solution first used to free at least some of the pores of the substrate to accept the solution subsequently brought into contact therewith.

When the phosphoric acid salt and/or the phosphate ester salt is laden with arsenic, antimony and/or bismuth, regeneration can be effected with an acid, especially hydrochloric or sulfuric acid, of high concentration. In the case of hydrochloric acid this concentration should be between 5 and 20% by weight whereas in the case of sulfuric acid, the concentration may be between 800 and 100 grams per liter.

The solution resulting from regeneration, i.e., the regenerate, has a proportionately high concentration of arsenic, antimony, and/or bismuth and in a corresponding small volume. Thus the impurity elements can be recovered without difficulty.

It has been found to be especially advantageous to carry out the regeneration so that a certain selectivity results. This can be achieved if the regenerating solution, initially, contains complex-forming compounds such as oxalic acid or oxy or carboxylic acids, for example tartaric acid or citric acid, or their salts, whereby arsenic and antimony can be recovered substantially quantitatively. A second regenerating liquid can then be brought into contact with the phosphoric acid salt or phosphate ester salt adsorbent to recover substantially all of the bismuth therefrom. The latter solution can be one of the acid solutions mentioned above.

The principal advantage of the present invention resides in the fact that large volumes of aqueous impurity-containing liquid can be treated in a proportionately small vessel at relatively high throughputs to eliminate arsenic, antimony, and/or bismuth therefrom while the recovered arsenic, antimony and/or bismuth is found in a highly concentrated state in the regenerating solution.

The process according to the present invention has been found to be especially advantageous when used for the cleaning of electrolyte solutions of the type used in the refining and recovery of nonferrous metals, especially copper by electrolysis. With these solutions it has been found that it is not necessary to remove all the arsenic, antimony and/or bismuth from the electrolyte quantitatively. It is sufficient that the treatment reduces the concentration of these impurity elements that the levels remaining in the electrolyte do not adversely effect the nonferrous metal recovery.

SPECIFIC EXAMPLES

The invention will become clearer from the following Examples:

EXAMPLE 1

Five test masses are made of low-solubility or insoluble salt impregnated substrates, each with 40 kilograms of silica balls with a mean diameter of 5 mm, a means porosity of 72% and a mean pore diameter of 10 millimicrons by immersion of the substrate in the treating solution. The parameters are set forth in Table 1.

TABLE 1

| Substrate | 1st Treatment solution | 2nd Treatment solution | Formed Salt |
|---|---|---|---|
| 1a | 20 kg phosphoric acid (85% by weight) 100 kg water 50 kg $SnCl_4$ | 5% ammoniacal solution (aqueous) | Tin phosphate |
| 1b | 120 kg water 50 kg $CeCl_3$ | 10% ammoniacal ammonium phosphate solution | Cerium phosphate |
| 1c | 120 kg water 50 kg $ZrCl_4$ | 10% phosphoric acid | Zirconium phosphate |
| 1d | 120 kg water 50 kg $LaCl_3$ | 10% ammoniacal ammonium phosphate solution | Lanthanum phosphate |
| 1e | 120 kg water 50 kg $TiCl_3$ | 10% ammoniacal ammonium phosphate solution | Titanium phosphate |

12.5 liters each of the substrates prepared as samples 1a through 1e are used to treat an electrolyte of the following composition (aqueous):

40: g/l Cu
15: g/l Ni
160: g/l $H_2 SO_4$
3640: mg/l As
230: mg/l Sb
75: mg/l Bi.

100 liters of this electrolyte are passed over a period of thirty minutes through a loose bed of the substrate. The residence time is determined by the rate of flow as described.

The solution drained from the bed had substantially its original concentration of copper, nickel and sulfuric acid in each case although the arsenic, antimony and bismuth compositions are those given in Table 2 for each substrate.

TABLE 2

| Substrate | Content of the drained solution in mg/l of | | |
|---|---|---|---|
| | As | Sb | Bi |
| 1a | 1730 | 21 | 19 |
| 1b | 3430 | 93 | 23 |
| 1c | 3340 | 104 | 52 |
| 1d | 3360 | 103 | 20 |
| 1e | 2820 | 26 | 49 |

The regeneration of the individual packings is carried out each with 20 liters of hydrochloride acid at a concentration of 200 grams per liter. As a result at least 90% of the adsorbed arsenic, antimony and bismuth were resolubilized. The packings were then used for a treatment of additional quantities of the electrolyte.

EXAMPLE 2

6 kilograms of balls of the type described in Example 1 were impregnated with a solution of the composition:

| 75 | l  | alcohol             |
|----|----|---------------------|
| 3  | l  | water               |
| 14 | kg | SnCl$_4$            |
| 20 | kg | acid phosphate ester |

After evaporation of the alcohol, the substrate was treated with aqueous ammonia to form the tin salt of the corresponding phosphate ester. The tin salt of the phosphate ester was firmly held in the pores of the balls. The resulting substrates had the compositions described in Table 3 in which, in the first column, is the number of the substrate, in the second column the alcohol component of the phosphate ester.

TABLE 3

| Substrate No. | Alcoholic components of the acidic phosphate ester |
|---|---|
| 2a | isooctanol |
| 2b | 2-ethylhexanol |
| 2c | lauryl alcohol |
| 2d | mixture of decanol, lauryl alcohol and myristicyl alcohol (equal parts by volume) |
| 2e | nonylphenoldiglycol ether |
| 2f | nonylphenoltetraglycol ether |
| 2g | nonylphenoloctaglycol ether |
| 2h | 2-butoxy-ethanol |
| 2i | stearyl alcohol octaglycol ether |
| 2k | phenol |

15 liters of the impregnated substrates 2a to 2k were each used in a container to treat 100 liters of an electrolyte (within 30 minutes) of the following composition:

40: g/l Cu
15: g/l Ni
160: g/l H$_2$SO$_4$
6210: mg/l As
176: mg/l Sb
85: mg/l Bi.

The solution recovered from the packings in each case had a copper, nickel and sulfate content practically unchanged from the original electrolyte solution. The content of arsenic, antimony and bismuth is given in the following Table 4 together with the substrate number.

TABLE 4

| Substrate No. | Content in the runoff solution in mg/l of | | |
|---|---|---|---|
| No. | As | Sb | Bi |
| 2a | 4 600 | 47 | 77 |
| 2b | 4 840 | 49 | 79 |
| 2c | 4 260 | 47 | 76 |
| 2d | 4 450 | 49 | 76 |
| 2e | 3 990 | 42 | 72 |
| 2f | 3 920 | 48 | 73 |
| 2g | 3 600 | 53 | 74 |
| 2h | 4 310 | 50 | 80 |
| 2i | 3 660 | 53 | 74 |
| 2k | 4 820 | 46 | 79 |

The regeneration of the impurity-laden substrates was carried out each in two steps with first a tartaric acid solution and thereafter a sulfuric acid solution.

The tartaric acid solution was 10% by weight in water and was used in an amount of 100 liters per packing. It removed 80% of the arsenic and at least 60% of the antimony.

In the second stage 20 liters of sulfuric acid of a concentration of 900 g/l was used. Over 90% of the bismuth and the residual amounts of arsenic and antimony were recovered.

The tartaric acid solution selectively recovers arsenic and antimony while the strong acid selectively recovers the bismuth. The arsenic and antimony can be recovered from the tartaric acid solution so that the latter can be rescued. The preferred method of removing the arsenic and antimony is by treating the tartaric acid solution with hydrogen sulfide to precipitate the arsenic and antimony as the sulfides.

EXAMPLE 3

6 kgs of balls having the properties described in Example 1 are immersed in a solution I and thereafter the water is evaporated and the substrate is treated with a fixing solution II. Solution I in each case contained 24 kg of water and 10 kg of the salt listed in column 2 of Table 5 below. The solution II consisted of 20 liters of alcohol and 5 kg of acid phosphoric phosphate ester whose alcohol component is listed in column 3 of Table 5.

TABLE 5

| Substrate No. | Salt in impregnating solution I | Alcoholic components of the ester in solution II |
|---|---|---|
| 3a | CeCl$_3$ | Mixture of cetyl alcohol and stearyl alcohol |
| 3b | LaCl$_3$ | oleyl alcohol |
| 3c | TiCl$_4$ | isotridecanol |
| 3d | ZrCl$_4$ | nonylphenoloctoglycol ether |

The slurry was then elutriated to remove superfluous phosphate ester salt and the impregnated substrate in an amount of 15 liters was filled as a packing into a container. Over a period of 30 minutes, 100 liters of a solution of the following composition was passed through the packing:

38 g/l Cu
18 g/l Ni
162 g/l H$_2$SO$_4$
6 600 mg/l As
172 mg/1 Sb
88 mg/l Bi.

The runoff solution contained practically the original concentrations of copper, nickel and sulfuric acid. The arsenic, antimony and bismuth contents is given in Table 6 for each of the substrates 3a – 3d.

TABLE 6

| Substrate No. | Content of the drained solution in mg/l of | | |
|---|---|---|---|
| | As | Sb | Bi |
| 3a | 6200 | 120 | 75 |
| 3b | 6180 | 130 | 79 |
| 3c | 5450 | 116 | 79 |
| 3d | 5890 | 129 | 80 |

The regeneration of the latent substrate is carried out as in Example 1 with similar results.

I claim:

1. A process for the adsorptive removal of an element from the group which consists of arsenic, antimony and bismuth from an aqueous solution containing same, comprising: treating the solution with an adsorbent consisting of a salt of phosphoric acid or of a phosphate ester, said salt or ester being located in the pores of a porous substrate consisting of particles having a maximum particle size of 3 to 10 mm and a porosity of at least 40%, said salt being a salt of a cation selected from the group which consists of trivalent cerium and lanthanum and tetravalent titanium, zirconium and tin, and recovering said element from said adsorbent.

2. The process defined in claim 1 wherein said particles are round.

3. The process defined in claim 2, further comprising the step of regenerating the adsorbent.

4. The process defined in claim 3, further comprising the step of regenerating the adsorbent by treating the same at first with a complex-forming compound selected from the group which consists of oxalic acid, tartaric acid and citric acid or a salt thereof and thereafter with an organic acid.

5. The process defined in claim 1 wherein the aqueous solution is an electrolyte solution in the refining recovery of a nonferrous metal by electrolysis.

* * * * *